United States Patent [19]

Layotte et al.

[11] 4,433,736

[45] Feb. 28, 1984

[54] DEVICE FOR AVOIDING SECONDARY IMPACTS RESULTING FROM THE BOUNCES OF A MASS AGAINST A TARGET-MEMBER

[75] Inventors: Pierre-Claude Layotte, Les Mathes; Laurent Bozec, Le Vesinet, both of France

[73] Assignees: Institut Francais du Petrole, Rueil-Malmaison; Compagnie Generale de Geophysique, Massy, both of France

[21] Appl. No.: 377,113

[22] Filed: May 11, 1982

[30] Foreign Application Priority Data

May 11, 1981 [FR] France .............................. 81 09474

[51] Int. Cl.³ .............................................. B23B 45/16
[52] U.S. Cl. ........................................ 173/94; 72/406
[58] Field of Search ................. 173/94, 38, 98, 99; 72/406

[56] References Cited

U.S. PATENT DOCUMENTS

| | | | |
|---|---|---|---|
| 673,697 | 5/1901 | Breckenridge | 72/406 |
| 1,486,869 | 3/1924 | Elias | 72/406 |
| 2,655,911 | 10/1953 | Van Russum et al. | 173/99 |
| 3,695,724 | 10/1972 | Taylor | 173/99 |

Primary Examiner—E. R. Kazenske
Assistant Examiner—W. Fridie
Attorney, Agent, or Firm—Millen & White

[57] ABSTRACT

A device for preventing secondary impacts of a mass against a target member, as used in particular for generating shear waves in the earth, is provided. The mass is secured at the end of a pivotable rigid arm actuated by driving device, and the driving device adapted to block the fall of the rigid arms, comprises a cam co-operating with a pawl when it registers therewith and with a flat part of the cam with the registering conditions occurring only after the first impact of the mass and its bounce against the target member.

6 Claims, 8 Drawing Figures

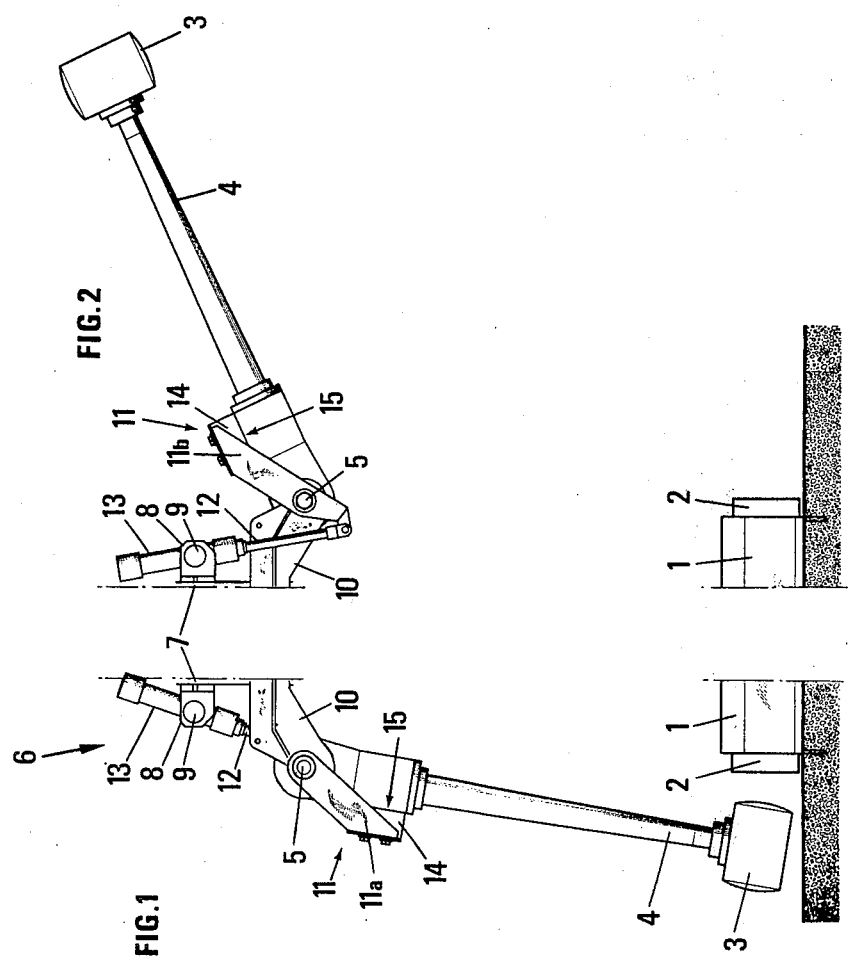

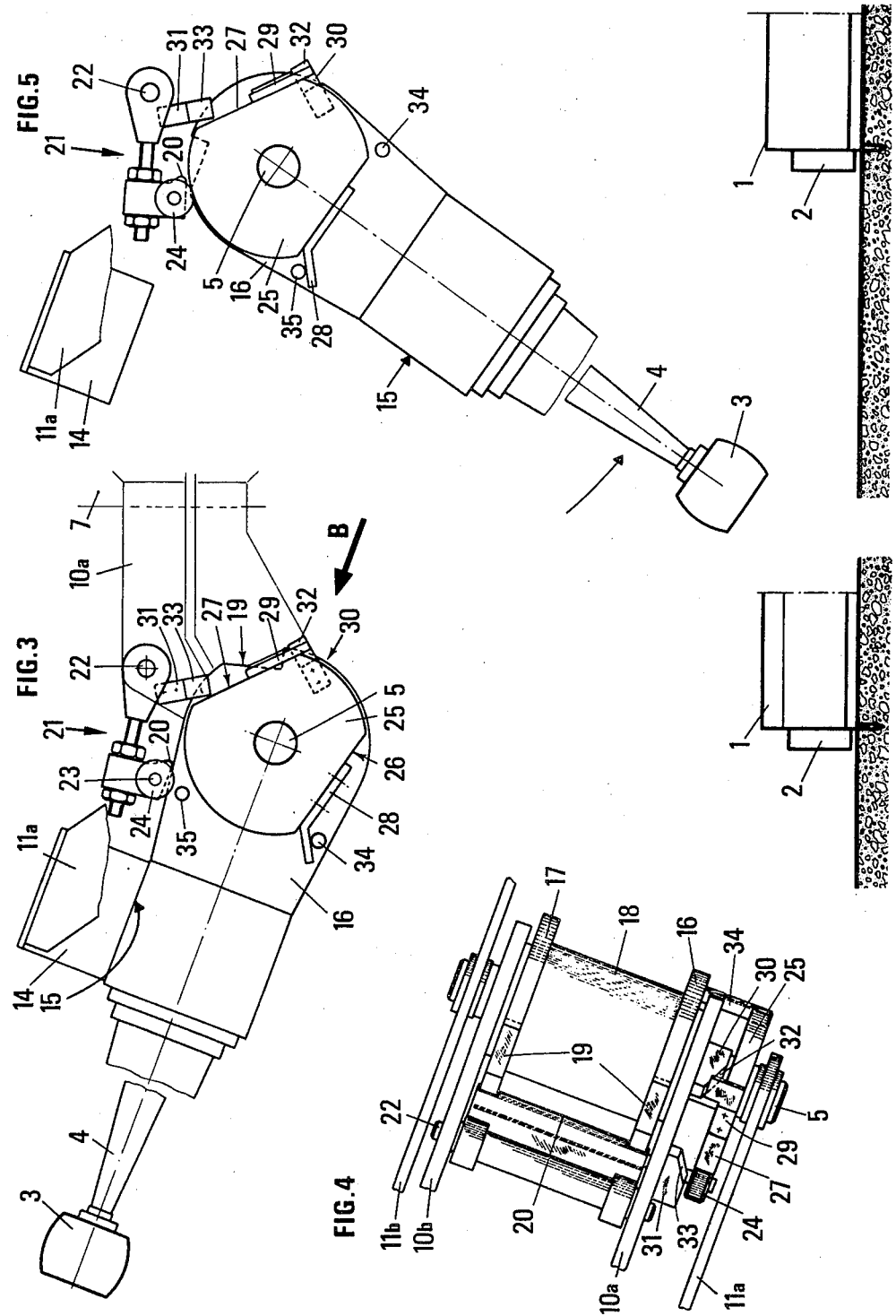

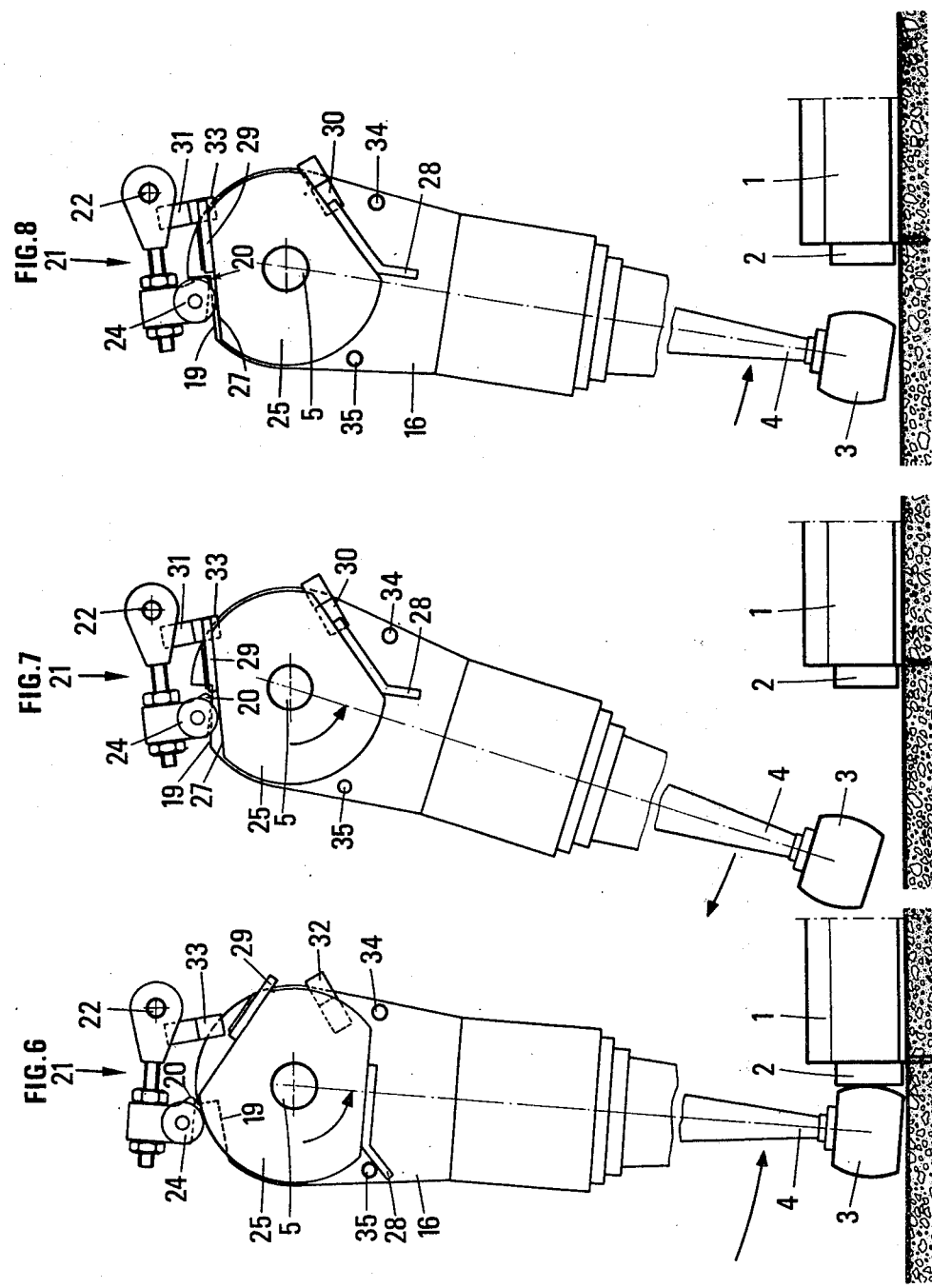

DEVICE FOR AVOIDING SECONDARY IMPACTS RESULTING FROM THE BOUNCES OF A MASS AGAINST A TARGET-MEMBER

BACKGROUND OF THE INVENTION

This invention has as an object a device for avoiding secondary impacts of a mass against a target-member, resulting from the bounces of the mass after the first impact.

More particularly, the invention concerns a device for avoiding secondary impacts of a mass secured at one end of a rigid arm pivotable about a support member, against a target member, which it strikes at the end of its fall.

Such a device may be advantageously provided on an apparatus for generating acoustic shear waves in the earth for seismic prospecting of the sub-soil and, particularly, on the device described in the French patent No. 2 276 599. This device comprises a target member provided with a ground coupling surface, at least one mass for striking the target-member and means for imparting to the mass a velocity having a component parallel to the coupling surface, said means comprising, for example, an orientable rigid support member, a rigid arm supporting the mass at its end, and driving means for lifting the mass by pivotation of the rigid arm with respect to the rigid support member.

The first impact is generally followed with one or more secondary impacts due to bounces of the mass against the target-member. The secondary impacts are generally of much lower amplitude than the first one, but they nevertheless generate secondary pulses whose echoes on the reflecting layers of the sub-soil disturb the seismic recordings of the echoes of the main pulse.

SUMMARY OF THE INVENTION

The device according to the invention makes it possible to avoid the above-mentioned drawbacks. It is characterized by having means for maintaining the rigid arm spaced apart from the target-member after the first bounce.

This device also enables, in the case of the use of a second mass, the blocking of one of said masses during operation of the other.

This means comprises a pawl pivotable about the support member, at least one housing for said pawl arranged in the rigid arm and at least one temporization means whereby the pawl enters its housing only after the first bounce of the mass against the target member. The introduction of the pawl into its housing has the effect of blocking any subsequent fall of the rigid arm.

BRIEF DESCRIPTION OF THE DRAWINGS

Other characteristics and advantages will be made apparent from the following description of an embodiment of the device described as a non-limitative example of the invention and with reference to the accompanying drawing wherein:

FIG. 1 diagrammatically shows an embodiment of apparatus adapted to generate in the earth acoustic shear waves by striking of a mass secured to the end of a pivoting rigid arm, against a target member coupled to the earth, to which the device according to the invention may be associated, the mass being shown close to its lower position;

FIG. 2 shows a diametrically opposed view of the same apparatus, the mass being maintained in its upper position;

FIG. 3 diagrammatically shows the device associated to each rigid arm whereby secondary impacts of the mass against the target member may be avoided, said rigid arm being in upper position;

FIG. 4 diagrammatically shows a view along axis B of FIG. 3;

FIG. 5 diagrammatically shows the device according to FIG. 3, the rigid arm being in an intermediary position during its fall towards the target member;

FIG. 6 diagrammatically shows the device according to FIG. 3, the rigid arm being in lower position and the mass in contact with the target member;

FIG. 7 diagrammatically shows the device according to FIG. 3, the rigid arm bouncing after the shock, and FIG. 8 diagrammatically shows the device of FIG. 3, wherein the rigid arm is blocked and the mass maintained at a certain distance from the target member, after its bounce.

DETAILED DISCUSSION OF THE INVENTION

The apparatus for generating acoustic shear pulses, shown in FIGS. 1 and 2, comprises a target member 1 which may be coupled to the earth and provided with a striking plate 2 and at least one mass 3 secured to the end of at least one rigid arm 4, adapted to pivot about an axle 5, by the action of driving means 6 secured to any rigid support member 7 which may be, for example, associated with a carrying vehicle. The rigid support member 7 comprises a radial extension 8 provided with a housing for an axle 9 and a bent lug 10 located below the radial extension 8 and provided at the vicinity of its end with a housing for the pivot axle 5 of the rigid arm 4.

The driving means comprises a lifting arm 11, formed of two integral branches 11a and 11b of unequal lengths, the shorter and the longer being respectively apparent on FIGS. 1 and 2. At a certain distance from one of its ends, the longer branch 11b of the lifting arm 11 is provided with means for securing the rod 12 of a jack 13. At the opposite end of the lifting arm 11 is secured an intermittently retaining means consisting, for example, of an electro-magnet 14. The rigid arm 4 comprises a metal part 15 against which may be applied the electro-magnet 14, in any position of this arm, by the displacement of the rod of jack 13 whereby the lifting arm 11 is pivoted about its axle 5.

The driving means are arranged so that the plane wherein the mass 3 is moved be perpendicular to the striking plate 2 provided on a lateral face of the target member 1. The length of the rigid arm 4 is, of course, so calculated that the mass 3 comes in contact, in lower position, with the striking plate 2.

The apparatus for generating acoustic shear pulses may advantageously comprise two masses supported by two rigid arms adapted to pivot in a plane tranverse to the target member and are operated simultaneously or successively, so as to generate at will impacts in two opposite directions. The apparatus for generating acoustic shear waves operates as follows:

The target-member is coupled to the earth surface at the selected location and the rigid arm 4 being in upper position (position of the arm shown in FIG. 2), the jack 13 is actuated so as to retract its rod 12. The lifting arm 11 pivots about its axles 5 to its lower position (position of the lifting arm such as shown in FIG. 1) where the electro-magnet 14 comes in contact with the metal part 15 of the rigid arm 4 in lower position;

the electro-magnet 14 is then energized so as to rigidly secure the rigid arm 4 with the lifting arm 11;

the jack 13 is then actuated so as to make its rod 12 slide to its extended position. The movement of the rod results in the pivotation of the lifting arm 11 which drives the rigid arm 4, rigidly secured thereto through the electro-magnet 14, towards its upper position (position of the rigid arm 4 shown in FIG. 2);

at the time selected for the triggering, the feeding of the electro-magnet 14 is discontinued. The rigid arm 4 being no longer retained, pivots about its axle 5 by the action of its own weight and it impinges the striking plate 2 of the target-member. The latter being coupled to the earth, the shock generates shear waves useful in seismic prospecting.

In order to avoid that the mass strike again the striking plate 2 after its bounce, the device according to the invention, described hereinafter with reference to FIGS. 3 to 8, is associated to the driving means 6.

The device is arranged, for example, on the rotation axle 5, common to the lifting arm 11, to the bent lug 10 integral with the rigid support member 7 (FIG. 1) and to the rigid arm 4 supporting the mass 3. Within the interval between the two branches 11a and 11b of the lifting arm, is placed (FIG. 4) the bent lug 10, itself formed of two parallel plates 10a and 10b, having the head of the rigid arm 4 therebetween. This head is provided with two flanges of circular shape 16,17 joined through a cross-member 18. Each flange is provided with a housing or recess 19 of a shape adapted to accomodate a snug 20 secured at the end of a pawl 21 (FIG. 3) pivotable about an axle 22 carried by two parallel plates 10a and 10b of the bent lug 10. A ring made of flexible material (e.g. polyurethane) may be placed between the axle 22 and the pawl 21. This ring will protect axle 22 from the effects of the shock generated at the blocking moment (see the description of the operation below,) and to dampen the reactions of the rigid arm 4. To the pawl 21 is secured an axle 23 about which pivots a roller 24. The latter is adapted to come in abutment against the outline of a circular cam 25 freely rotatable about a common axle 5. The diameter of the roller 24 is larger than the height of the snug 20. This circular cam 25 is provided with two flat parts 26 and 27. To the flat part 26 is secured a bent stick 28 (FIG. 3). An L-shaped braking plate 29, made of flexible material, is secured to the other flat part 27 of the cam. Two stop cleats 30 and 31 are secured to the external wall of the plate 10a of the bent lug 10. Each of these two cleats comprises a braking ramp 32 and 33. The distance between the plate 10a of the bent lug 10 and the cam 25 is selected so that a portion of the deformable braking plate 29 is pressed against the braking ramps 32 and 33 for two separate positions of the cam 25 with respect to the plate 10a of the bent lug. In addition, two driving fingers 34 and 35 are secured to the flange 16 of the head of the rigid arm 4. Their length is selected so that they press on the bent stick 28 secured to the flat part 26 of the cam, for two respective positions of the latter with respect to the support arm 4. The cam forms a temporization means whereby the pawl penetrates the recesses 19 only after the shock of the mass 3 against the target member 1.

The respective position of the different elements of the device for avoiding multiple shocks will be explained more in detail during the description of its operation given with reference to FIGS. 1 to 3 and 5 to 8.

After the lifting arm 11 has been lowered to bring the electro-magnet 14 in contact with the metal part 15 of the rigid arm 4, and said electro-magnet has been energized (FIG. 1), the hydraulic jack 13 is actuated. The rigid arm 4 is then driven towards its upper position (FIGS. 2 and 3). During its upraise, the finger 34 (FIG. 3) secured to flange 16 of the head of the rigid arm 4 is pressed against the bent stick 28 and causes the cam 25 to rotate to a first limit position shown in FIG. 3. In said first position the braking plate 29 presses on the ramp 32 of cleat 30 and fixes the cam in position.

After its release, the rigid arm 4 begins to pivot towards its lower position. For a determined position of the rigid arm (FIG. 5), the finger 35 presses against the bent stick 28 and drives the cam 25. The flexible braking plate 29, is then disengaged from the cleat 30 and the cam freely rotates about axle 5 under the impulse received from finger 35 (FIG. 6).

When the rigid arm 4 reaches the vicinity of its lower position, and when the same mass 3 impinges the striking plate 2 (FIG. 6), the snug 20 registers with recesses 19 arranged in the flanges 16 and 17 of the head of the rigid arm but it cannot fall therein since the roller 24 then bears upon a circular portion of cam 25. The supporting arm may thus freely move to its lower position.

Under the effect of the shock of mass 3 against the striking plate 2, the rigid arm 4 bounces in reverse direction (FIG. 7). Simultaneously, as a result of the existing velocity, the cam continues to rotate in the same direction until the flat part 27 thereof registers with roller 24. The rise of this flat part being chosen greater than the height of snug 20, the pawl 21 no longer rests on roller 24 but on the outline of the circular flange 16.

The back motion of the rigid arm 4 having brought back the recesses 19 in front of the snug 20, the latter falls therein and blocks the rigid arm 4 which begins after its bounce to fall again towards the target member (FIG. 8).

The free motion of the cam 25 under the initial impulse of finger 35 is interrupted (second limit position) when the flat part 27 thereof comes near the recesses 19, since, in this position, the flexible braking plate 29 comes in abutment against the ramp 33 of the other stop cleat 31 (FIG. 8). A new cycle begins when, by raising of the rigid arm towards its upper position, the cam is again driven by finger 34.

By associating such a device with each rigid arm 4, only shear pulses are produced which permit obtaining seismic recordings of good quality.

In the case where the apparatus for generating in the earth acoustic shear waves comprises two rigid arms pivotally and symmetrically arranged with respect to the support, the blocking device according to the invention makes it possible to maintain one of the arms at the vicinity of its lower position while the other is used to strike the target member. This avoids secondary impacts of the mass not in use, which, in the absence of blocking, would have been generated by the primary impact of the mass in service.

What is claimed is:

1. A device for avoiding secondary impacts of a mass (3) against a target member (1) due to the bounces of the mass after a first impact, the mass being secured to one end of a rigid arm (4) adapted to pivot about an axle (5) with respect to a support (7), and the device comprising means for maintaining the rigid arm apart from the target member after the first bounce, said means comprising a pawl (21) pivotable with respect to the support, at least one housing (19) for the pawl, provided in the rigid arm, and a temporization means for permitting the pawl to penetrate into its housing only after a first bounce of the mass against the target member, and the introduction of the pawl into its housing blocking the lowering motion of the rigid arm.

2. A device according to claim 1, wherein the pawl (21) comprises a roller (24) associated with a snug (20) which is adapted to follow the outline of a round part of the rigid arm (4), and the temporization means comprises a cam (25) freely pivotable about the rotation axle (5) of the rigid arm (4) between two limit positions under the action of said rigid arm, and being provided with at least one flat part (27) whose rise is higher than the height of the recesses, and with the roller being adapted to follow the outline of said cam.

3. A device according to claim 2, wherein the cam (25) comprises a braking plate (29) adapted to press against stop cleats (30) (31) rigidly secured to the rigid arm, the position of these stop cleats defining the limit positions of the cam.

4. A device according to claim 2, further comprising a bent stick (28) rigidly secured to the cam, and two fingers (34,35) integral with the rigid arm, adapted to press against the bent stick (28), in certain relative positions of the rigid arm with respect to the cam, and to drive the latter in rotation.

5. A device according to claim (3), wherein the braking plate is made of deformable material, and the stop cleats are each provided with a braking ramp (32,33) against which the deformable braking plate is adapted to press.

6. A device according to claim 1, wherein the pawl pivots about an axle (22) which is held on the support through dampening means.

* * * * *